United States Patent [19]

Janda et al.

[11] Patent Number: 5,041,952
[45] Date of Patent: Aug. 20, 1991

[54] CONTROL CIRCUIT FOR A SOLAR-POWERED RECHARGEABLE POWER SOURCE AND LOAD

[75] Inventors: Rudolph W. Janda, Spring Grove; Jerald L. Douglas, Antioch; Edward F. Condon, Jr., Northbrook, all of Ill.

[73] Assignee: Intermatic Incorporated, Springrove, Ill.

[21] Appl. No.: 387,682

[22] Filed: Jul. 31, 1989

[51] Int. Cl.⁵ .......................... H02J 7/00; F21L 7/00
[52] U.S. Cl. .................................. 362/183; 323/906; 320/40
[58] Field of Search ................. 323/906; 362/183; 320/19, 21, 31, 39, 61, 32, 33, 29, 40

[56] References Cited

U.S. PATENT DOCUMENTS

| | | |
|---|---|---|
| Re. 32,450 | 6/1987 | Blake . |
| 2,635,681 | 4/1953 | Hiltman et al. . |
| 2,780,765 | 2/1957 | Chapin et al. . |
| 2,889,490 | 6/1959 | Paradise . |
| 3,241,029 | 3/1966 | Slomski . |
| 3,317,809 | 5/1967 | Bowers et al. . |
| 3,521,047 | 7/1970 | Smith . |
| 3,864,861 | 2/1975 | Hill, Jr. . |
| 4,009,051 | 2/1977 | Kazis et al. . |
| 4,009,535 | 3/1977 | Stock . |
| 4,100,427 | 7/1978 | Durand et al. . |
| 4,134,056 | 1/1979 | Fukui et al. . |
| 4,164,698 | 8/1979 | Kleeberg . |
| 4,180,850 | 12/1979 | Bievens . |
| 4,200,904 | 4/1980 | Doan . |
| 4,281,369 | 7/1981 | Batte . |
| 4,283,657 | 8/1981 | Gordon et al. . |
| 4,314,198 | 2/1982 | Rogers . |
| 4,333,136 | 6/1982 | Baker . |
| 4,343,032 | 8/1982 | Schwartz . |
| 4,354,148 | 10/1982 | Tada et al. . |
| 4,384,317 | 5/1983 | Stackpole . |
| 4,387,332 | 6/1983 | Oyamada et al. . |
| 4,410,930 | 10/1983 | Yachabach ............. 362/183 X |
| 4,422,130 | 12/1983 | Shigeo . |
| 4,441,143 | 4/1984 | Richardson, Jr. ........... 362/183 |
| 4,484,104 | 11/1984 | O'Brien . |
| 4,486,820 | 12/1984 | Baba et al. . |
| 4,587,459 | 5/1986 | Blake . |
| 4,626,764 | 12/1986 | Weinhardt .............. 323/906 X |
| 4,639,656 | 1/1987 | Mukai . |
| 4,661,758 | 4/1987 | Whittaker . |
| 4,751,622 | 6/1988 | Williams . |
| 4,774,648 | 9/1988 | Kakuk et al. . |
| 4,786,851 | 11/1988 | Fuji et al. . |
| 4,814,961 | 3/1989 | O'Brien et al. . |
| 4,835,664 | 5/1989 | Wen ........................ 362/183 |
| 4,843,525 | 6/1989 | Williams . |

OTHER PUBLICATIONS

Schematic and description of Brinkman rechargeable low voltage solar-powered outdoor light, no date.

Primary Examiner—Steven L. Stephan
Assistant Examiner—Emanuel Todd Voeltz
Attorney, Agent, or Firm—Willian Brinks Olds Hofer Gilson & Lione

[57] ABSTRACT

An inexpensive circuit for controlling the recharging of a rechargeable power source by a photovoltaic panel is used for powering a load such as the lamp of a walk light. Using a minimum number of components, the circuit can charge a rechargeable battery anytime sunlight is sufficient to place a potential across the battery that is greater than the present potential of the battery, can sense a decrease in voltage across the photovoltaic panel with diminishing ambient light and energize the load, can prevent the load from being energized when the ambient light level is sufficient to re-charge the battery, can provide positive feedback at turn-on of the load, thereby hastening turn-on and providing hysteresis, can provide for adjusting the hysteresis bands, can shift the turn-on and turn-off thresholds, and can provide an adequate current to guarantee turn-on when using low leakage solar panels. A further embodiment can additionally exhibit hysteresis at load turn-off so that the load does not cycle on and off and can further raise the load turn-off threshold above the level where the battery is substantially discharged, thereby hastening recharging of the battery. A still further embodiment provides temperature compensation for improved performance.

30 Claims, 3 Drawing Sheets

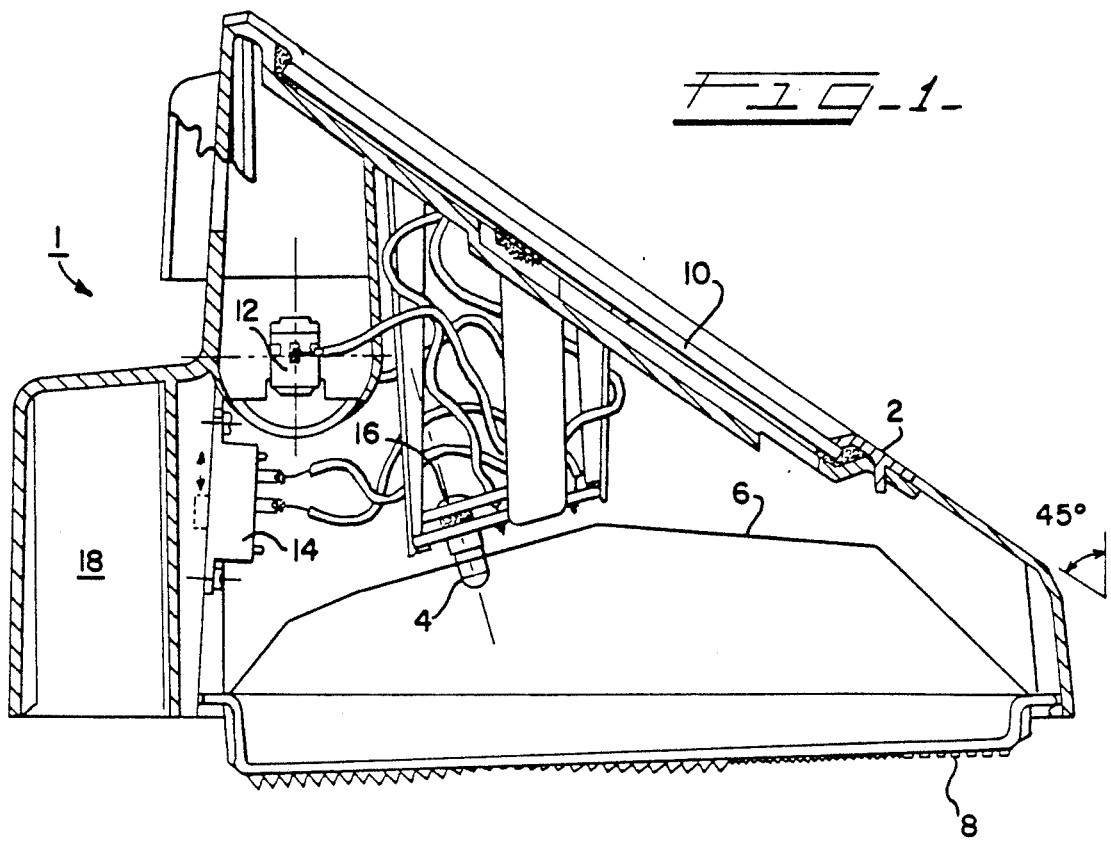
FIG-1-
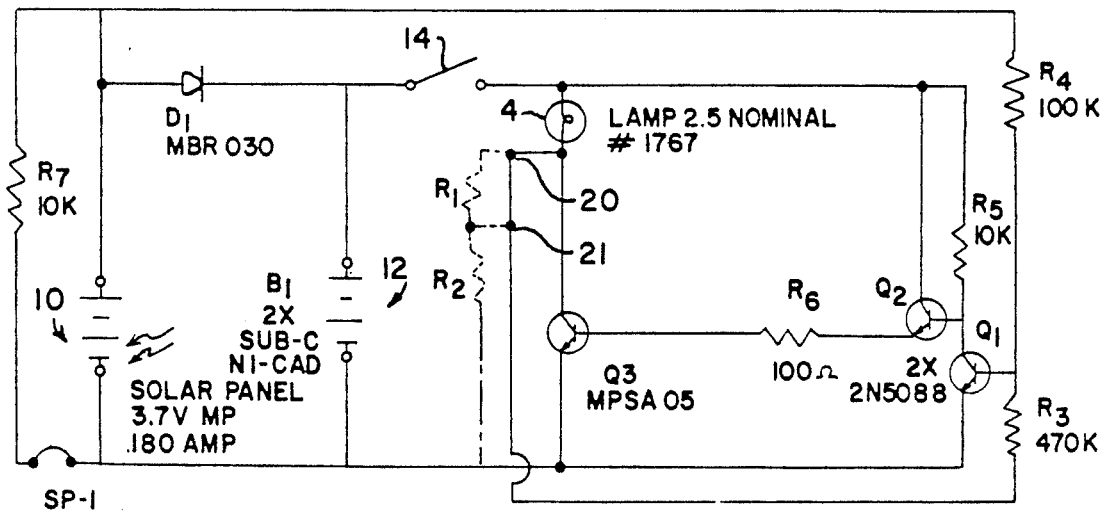
FIG-2-

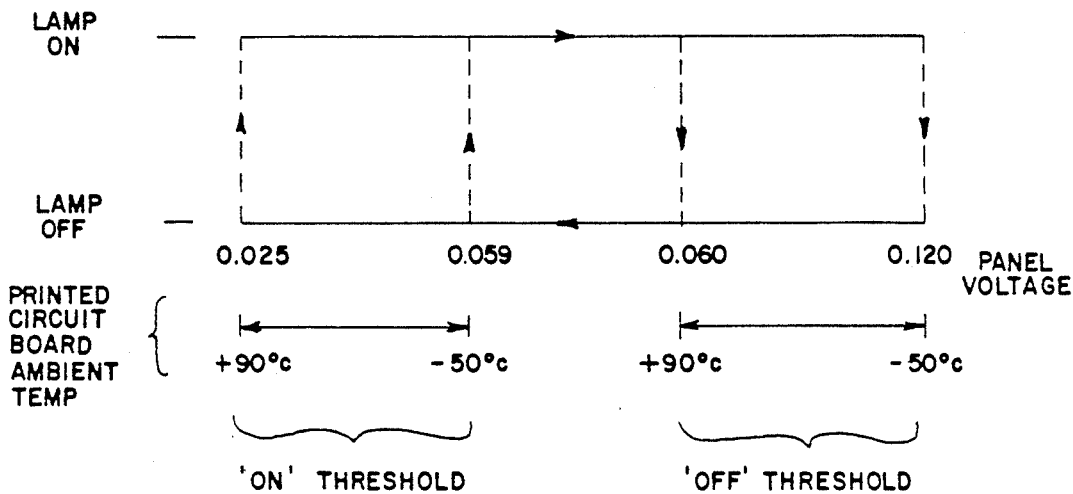
FIG-5-
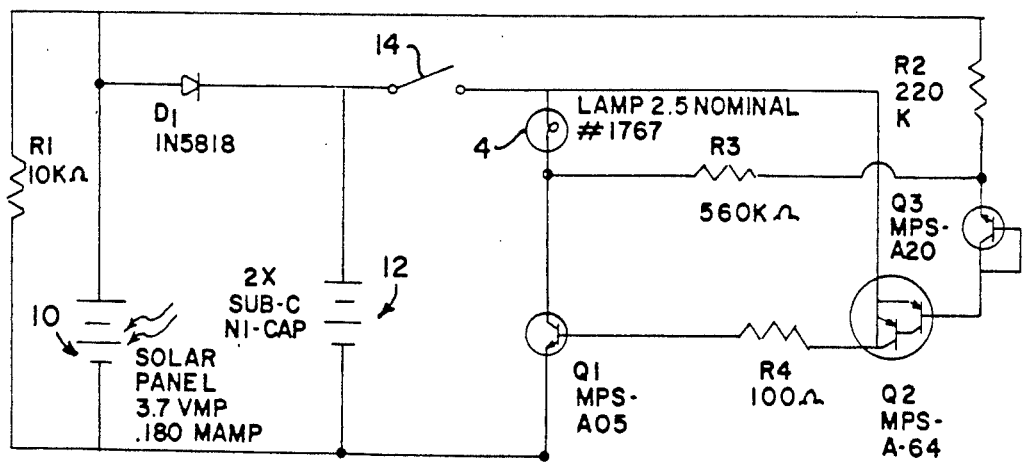
FIG-6-

CONTROL CIRCUIT FOR A SOLAR-POWERED RECHARGEABLE POWER SOURCE AND LOAD

FIELD OF THE INVENTION

The present invention recites to a low cost circuit for using light to charge a rechargeable power source and for turning on and off a load. In a presently preferred application, sunlight is used to charge a rechargeable battery or battery pack, the battery then being used to power a lamp at night.

BACKGROUND OF THE INVENTION

It has been known to use a phototransistor and a photo-conductive cell for ambient light detection in combination with a photovoltaic device (herein sometimes called a solar panel) to charge a battery for illuminating a sign at night, as shown in U.S. Pat. No. 4,009,535 of Stock. U.S. Pat. Nos. 4,314,198 of Rogers and 4,384,317 of Stackpole note that a timer may be used in lieu of a photoresistor for turning on an illuminated sign at night where the sign is powered by a solar-powered rechargeable battery.

From U.S. Pat. No. 4,486,820 of Baba et al it is known to use the state of a current-producing solar cell as a way of detecting the level of ambient light and, during darkness, to use a timer to disconnect a rechargeable battery before it drains.

U.S. Pat. No. 3,317,809 of Bowers et al discloses two solar panels, one for using ambient light to power an electro-mechanical switch, the other panel being used to charge a battery. U.S. Pat. No. 4,009,051 of Kazis et al also uses mechanical or electromechanical switches, in particular in the case of a solar power pack for use at remote locations.

Some solar powered apparatus, typically having a high number of circuit elements, provide hysteresis or a timer in one or more circuit operations in order to avoid undesired frequent cycling. Examples are given in U.S. Pat. No. 4,333,136 of Baker and U.S. Pat. No. 4,587,459 of Blake.

Other examples of apparatus having rechargeable batteries may be seen in U.S. Pat. Nos. 4,283,657 of Gordon et al, U.S. Pat. No. 4,484,104 of O'Brien and U.S. Pat. No. 4,661,758 of Whittaker.

The patents listed above represent a range of complexity and therefore a range of cost. In some applications, perhaps represented by the patent of Stock, it is more desirable than in other applications to minimize the number and cost of circuit elements so as to provide the relevant market with low cost products. It is also desirable to eliminate moving parts, as in an electromechanical switch. Even so, there is a need to achieve these goals without sacrificing performance, and preferably by enhancing performance.

SUMMARY OF THE INVENTION

The present invention provides a low cost circuit for using light to charge a rechargeable power source and to turn on and off a load. It has a presently preferred application in which sunlight is used to charge a rechargeable power source such as a battery or battery pack, the power source then being used to power a lamp at night. A photovoltaic panel charges the rechargeable power source. Switching circuitry reacts to the drop in output voltage of the photovoltaic panel as ambient light decreases and connects the lamp to the rechargeable power source. Likewise, the current through the lamp is blocked when the voltage of the panel is high.

This dual use of a photovoltaic panel both for charging purposes and for controlling the operation of a lamp allows for the elimination of other means such as a photo cell to detect darkness. It has been estimated that this factor alone can save between fifty cents and one dollar in the cost of manufacture of an invention such as the current one. Of course, in a typical distribution system this cost saving would be multiplied in the final cost to the consumer.

The above-noted cost advantage is more significant because of the already low cost of a switching system as disclosed herein and forming part of the current invention. The switching system has an unusually low number of components as compared with most known prior art devices yet performs functions not precisely found in the known prior art, even in systems having significantly more components.

In the form most preferred at present, the current invention finds application in a light for illuminating a walking surface at night. In this application, there is provided apparatus offering reduced cost over the known prior art yet performance that is acceptable for many applications.

BRIEF DESCRIPTION OF THE DRAWINGS

FIG. 1 is an elevational cross-section of a walk light of a presently preferred design and embodying the current invention;

FIG. 2 is a schematic showing two variations of a first embodiment of a circuit according to the current invention;

FIG. 5 is an estimated hysteresis diagram of the circuit of FIG. 4; and

FIG. 6 is a schematic illustrating a third embodiment of a circuit according to the current invention.

DETAILED DESCRIPTION OF THE PRESENTLY PREFERRED EMBODIMENTS

Figure 3:
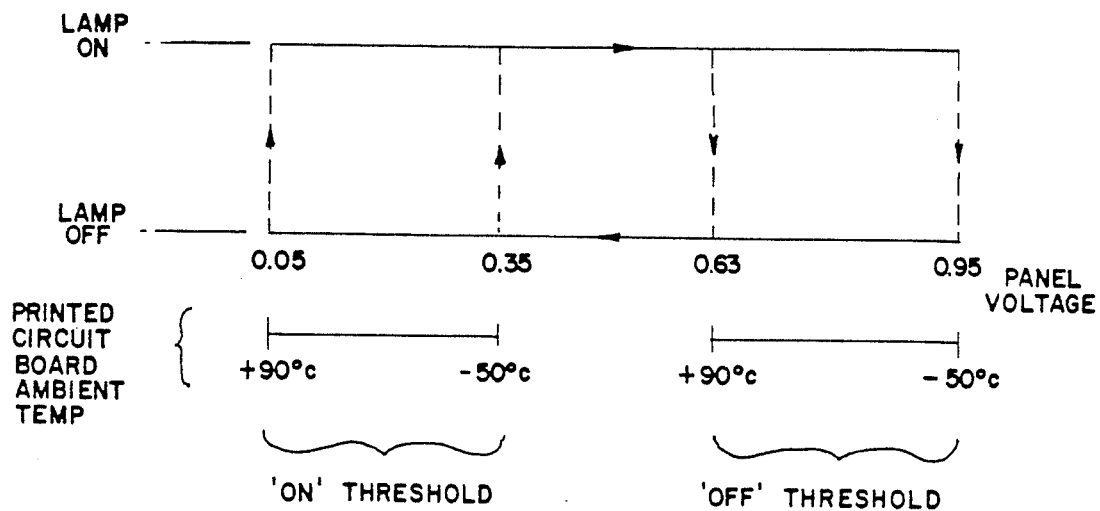
FIG. 3 is a hysteresis diagram of the circuit of FIG. 2.

FIG. 1 shows a walk light (1) intended to be mounted slightly above a walking surface in order to provide low intensity nighttime illumination. A housing (2) mounts an incandescent lamp (4) cooperating with a reflector (6) and shining downward through clear plastic lens (8) to illuminate a surface beneath the housing (2) when the lamp (4) is lit. A photovoltaic panel (10) of known design and measuring, for example, four inches by six inches is mounted in an upper face of the housing (2). The upper surface of the housing is slanted, for example at an angle of 45° with respect to the vertical, in order to increase the total solar energy incident on the photovoltaic panel (10) in a typical outdoor installation. Where the unit is installed in a location that enjoys unobstructed sunlight throughout the day, the total solar energy incident on the photovoltaic panel (10) may be increased by orienting the panel (10) toward the equator.

Housing (2) also mounts a rechargeable power source (12), a two-position manual switch (14), and a printed circuit board assembly (16), all of which will be discussed more fully below. A receptacle (18) receives a mounting means of any conventional design for mounting the housing (2) at any desired height and disposition with respect to a walking surface.

FIG. 2 is a schematic illustrating a first embodiment of a circuit according to the current invention. The figure identifies specific components that are acceptable for use in this embodiment. The photovoltaic panel (10) is of a type commercially available from Arco Solar, Inc. of Camarillo, California. The rechargeable power source (12), also called B1, may be made from two nickel cadmium rechargeable sub-C size series-mounted batteries each having a nominal voltage of 1.2 volts. For convenience, the rechargeable power source (12) will be referred-to as a battery.

The circuit of FIG. 2 controls the charging of the battery (12) by photovoltaic panel (10) and further controls the discharge of the battery (12) into the load represented by lamp (4) in response to a decreasing ambient light level, where the ambient light level is detected by the photovoltaic panel (10).

The battery (12) is supplied with a charging current by photovoltaic panel (10) through diode D1 in the presence of sufficient ambient light. That is, the panel (10) will charge the battery (12) at all times when the voltage across the panel (10) less the voltage drop across D1 is greater than the instantaneous voltage of the battery (12). D1 prevents the photovoltaic panel (10) from discharging the battery (12) when the panel is in diminished light.

Manual switch (14), when opened, prevents the load (4) from operating and further prevents the discharge of the battery (12) during storage. However, even when switch (14) is open, battery (12) still may be charged by exposing the panel (10) to sufficient light.

When the ambient light level is sufficiently high, the voltage across the solar panel causes a first switch in the form of a transistor Q1 to conduct, thereby pulling down the voltage at the base of a second switch in the form of a transistor Q2 to a voltage level sufficient to prevent Q2 from conducting. As the ambient light level falls, the output voltage of the photovoltaic panel (10) drops. Eventually the voltage at the base of Q1 becomes sufficiently low that it prevents Q1 from conducting. This raises the voltage at the base of Q2 sufficiently that Q2 begins to conduct. The current flow from the emitter of Q2 in turn begins to drive a third switch in the form of a transistor Q3 through drive resistor R6. As Q3 begins to conduct, the voltage at its collector drops, providing positive feedback through R3, drawing down the potential at the base of Q1, thereby hastening turn-on of the lamp and providing hysteresis.

This hysteresis of the load turn-on and load turn-off thresholds is illustrated in FIG. 3 for the specific circuit illustrated in FIG. 2. It may be seen in FIG. 3 that, for any given ambient temperature, the load turn-on and load turn-off thresholds will be unequal, thereby providing hysteresis. Therefore, the hysteresis prevents an already energized load such as an illuminated lamp from de-energizing unless a substantially higher light level exists. This feature minimizes the load's cycling on and off in response to minor variations in illumination intensity near the threshold, as might be caused by passing clouds or other moving shadows.

The load (4) will remain energized until the energy that was previously stored in the battery (12) is nearly exhausted. The battery (12) will recharge during the next period of illumination. This recharge represents the beginning of another charge/discharge/ idle cycle period.

The ratio of R4 to R3 sets the width of the hysteresis band. In an optional variation, the short circuit represented by the solid line between circuit nodes 20 and 21 in FIG. 2 may be replaced by a voltage dividing circuit shown in phantom and including resistors R1 and R2. These resistors may be used to further adjust the hysteresis band, or shift the "on" and "off" thresholds, or both.

A resistor R7 is connected in parallel with the terminals of the solar panel 10. R7 provides adequate shunt current through R4 to guarantee turn-on when using panels having high dark resistance.

It may be seen that a number of distinctly advantageous functions may be provided by a circuit such as that of FIG. 2, yet the circuit uses no timer, no photocell, only three transistors and a small number of resistors to perform its electronic switching. In particular, the illustrated circuit:

1. can charge a rechargeable power source anytime that ambient light is present in sufficient strength to place a potential across the battery that is greater than the instantaneous potential of the battery;

2. can sense a decrease of voltage across a photovoltaic panel in the presence of diminishing ambient light and cause a load to be placed across a rechargeable power source;

3. can prevent the load from being energized when the ambient light level is sufficient to re-charge the rechargeable power source;

4. can provide positive feedback at turn-on of the load, hastening the turn-on and providing hysteresis in order that the load does not cycle on and off repeatedly;

5. can provide for adjustment of the hysteresis bands, or shifting the turn-on and turn-off thresholds, or both, through selection of resistances; and 6. can provide an adequate shunting current to guarantee turn-on when using low leakage photovoltaic panels.

Figure 4:
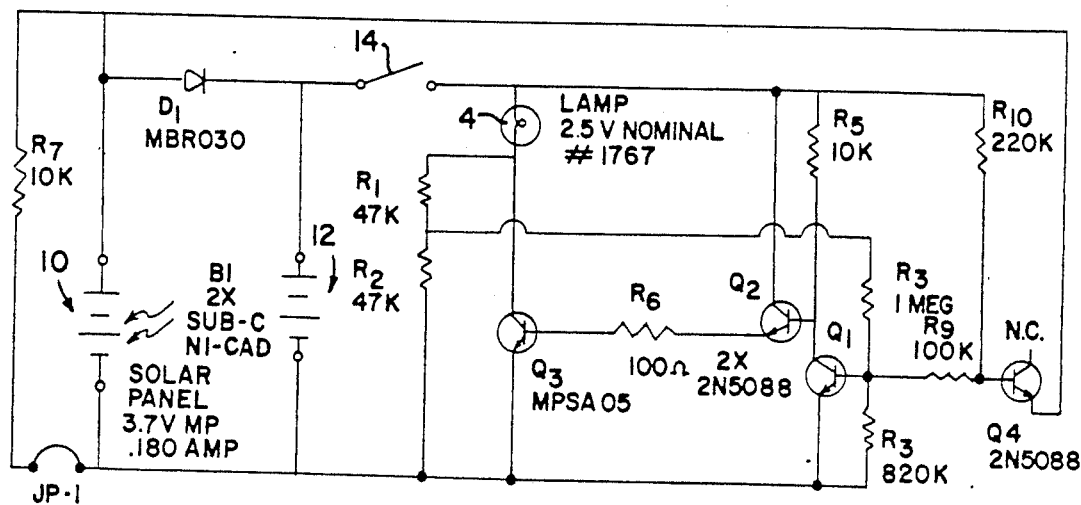
FIG. 4 is a schematic illustrating a second embodiment of a circuit according to the current invention.

FIG. 4 shows a schematic of a second embodiment of a circuit according to the current invention. Acceptable components for use in this embodiment are specified in the drawing. It may be seen that the circuit of FIG. 4 is substantially like that of FIG. 2 with the addition of a fourth switch in the form of a transistor Q4 and modifications to resistances in the circuit, notably including R8, R9 and R10.

Battery (12) is charged by photovoltaic panel (10) through diode D1. D1 prevents the photovoltaic panel from discharging the battery (12) when the panel is in diminished light.

Switch (14), when open, prevents lamp (4) from operating and further prevents the discharge of battery (12) during storage. Battery (12) may still be charged by exposing the panel (10) to sufficient light.

Load (4), typically a lamp, will become energized when the ambient light level drops to a pre-determined turn-on threshold. Hysteresis is provided to prevent an already energized load from de-energizing unless a substantially higher light level exists. Again, this minimizes the load's cycling on and off in response to minor variations and illumination intensity near the threshold.

An advantage of the circuit of FIG. 4 is that it allows both the turn-on and turn-off thresholds to be moved closer to zero voltage of the solar panel (10). Moving the turn-on threshold closer to zero delays the lamp's turning on until a darker, later time of day. Because the circuit is battery powered, this turn-on delay extends the potential operation of the apparatus so that, whenever the load is later turned off because of a lack of charge in the battery, such event occurs at a later hour of the evening. In addition, by delaying turn-on until darker conditions prevail, the circuit minimizes unintended or unnecessary operation caused by effects other than nightfall, such as passing clouds.

Furthermore, the circuit of FIG. 4 addresses the commercial reality that, at low light levels, many production solar panels exhibit a specific voltage output that is lower than is optimum for the circuits of the current invention.

A circuit according to FIG. 4 allows the thresholds to be moved closer to zero panel voltage by providing temperature compensation. According to this temperature compensation, each threshold is less sensitive to ambient temperature. This diminished sensitivity to ambient temperature may be seen by comparing the panel voltages of the hysteresis diagram of FIG. 3 with those of FIG. 5, the latter being an estimated hysteresis diagram according to the circuit of FIG. 4.

Theoretically, the circuit of FIG. 2 also could be adjusted so that the thresholds are closer to zero panel voltage. However, because of the potential variability of the thresholds due to ambient temperature, in the absence of temperature compensation, the very real possibility would exist that one of the thresholds actually would shift below zero panel voltage as a result of a change in ambient temperature. If such an event were to occur, the circuit would not work as intended; the lamp would be stuck on or off.

Temperature compensation in the circuit of FIG. 4 is provided by Q4, R8, R9 and R10, as shown. The additional transistor Q4 is substantially identical to Q1. By "substantially identical," it is meant that the effects of ambient temperature on the characteristics of Q4 and on the characteristics of Q1 will be substantially the same.

By inspection of the schematic of FIG. 4, it may be observed that Q4 is responsive to the difference in voltage between a terminal of the solar panel (10) and a terminal of the battery (12).

R8 and R9 form a voltage divider so that the voltage at the base of Q1 remains slightly less than the voltage at the base of Q4. As will be seen below, this effect maintains a fixed ratio of the actuation voltage to which Q4 is responsive and the actuation voltage to which Q1 is responsive.

The circuit at FIG. 4 works as follows.

When solar panel (10) is fully illuminated, the panel output voltage exceeds the voltage of the battery (12), causing the base-emitter of Q4 to be reversed biased. In this non-conducting state of Q4, battery current passes through R10 and R9 to the base of Q1, turning Q1 on. The conducting state of Q1 draws down the base of Q2, causing Q2 to be off, and in turn, causing Q3 to be off. In this state, the load (4) is off.

In response to decreasing ambient illumination, the solar panel voltage drops. When it reaches a point approximately 0.6 volts below the battery voltage, the base-emitter of Q4 becomes forward biased. Because of the emitter-base voltage drop at Q4, the voltage at the node between R9 and R10 will always equal the sum of the voltage at the emitter of Q4 and the value of the base-emitter voltage drop of Q4.

R9 and R8 form a voltage divider such that the voltage at the base of Q1 is slightly less than the voltage at the base of Q4.

As in the circuit of FIG. 2, Q1 is the threshold detecting device for the circuit of FIG. 4. When the voltage at the base of Q1 drops below the forward bias potential of Q1, Q1 is off. When the voltage at the base of Q1 reaches the forward bias potential of Q1, Q1 is on. Because Q1 and Q4 are substantially identical (in the illustrated example, both are 2N5088) and because they are similarly biased, the forward bias potentials cancel with respect to the sense node the emitter of Q4. In this manner, and further because of the action of voltage divider formed by R8 and R9, the load may be switched by panel threshold voltages very near to zero.

This cancellation of forward bias potentials contributes to the temperature compensation and helps overcome the fact that, in general, the base-emitter voltage drops of the individual transistors involved may range from about 0.3 to about 0.8 volts over the temperature range that a product such as the current invention may be expected to experience.

Equivalent results may be obtained by substituting for Q4 a diode having forward bias characteristics that are substantially close to the forward bias characteristics of the emitter-base junction of Q4.

In a circuit not providing for hysteresis, the approximate turn-on/turn-off threshold, in terms of panel voltage, would be the base-emitter voltage of Q1 at its present temperature multiplied by the ratio R9 divided by R8. With the application of hysteresis, even though the threshold is still temperature dependent, the specific thresholds may be moved very close to zero volts. With the solar panels presently available commercially, this corresponds to a level of illumination that is sufficiently low that the possible two-to-one or three-to-one shift in threshold is inconsequential.

As in the case of the circuit FIG. 2, R3 provides positive feedback to provide hysteresis. R1 and R2 allow the selection of feedback voltage to adjust or select specific hysteresis characteristics.

The remainder of the circuit works as previously described in regard to FIG. 2.

FIG. 6 shows a schematic of a third embodiment of a circuit according to the current invention. Again, acceptable components for use in this embodiment are specified in the drawing. The lamp (4), photovoltaic panel (10) and battery (12) are unchanged.

Battery (12) is charged by photovoltaic panel (10), again through diode D1. D1 prevents the photovoltaic panel from discharging the battery (12) when the panel is in diminished light.

As in the other embodiment, switch (14), when open, prevents the lamp (4) from operating and further prevents the discharge of battery (12) during storage. Battery (12) may still be charged by exposing the panel (10) to sufficient light.

As is the case with the embodiments of FIG.'s 2 and 4, the load (typically a lamp) will become energized when the ambient light level drops to a pre-determined turn-on threshold. Hysteresis is provided to prevent an already energized load from de-energizing unless a substantially higher light level exists. Again, this minimizes the load's cycling on and off in response to minor variations in illumination intensity near the threshold.

As the ambient light level falls to the load turn-on threshold, the output voltage across the panel (10) drops so that the voltage at the base of Q2 becomes sufficiently low for Q2 to begin conducting. This in turn begins to drive Q1 through drive resistor R4. As Q1 begins to conduct, the voltage at the collector of Q1 drops, causing positive feedback through R3 at the emitter of Q3, hastening turn on and providing hysteresis. The ratio of R2 to R3 sets the width of the hysteresis band.

The transistorized switching means of the circuit of FIG. 6 provides for sensing a low voltage condition of the battery (12) during its discharge. The load (4) will remain energized until the voltage across the battery (12) reaches a pre-determined level, at which time the load will be de-energized by the low voltage sensing. This benefit allows the battery (12) to recharge more quickly than if it were allowed to discharge fully or to a greater degree. The low voltage sensing employs hysteresis to prevent the load from cycling on and off due to the change in battery voltage, both loaded and unloaded.

The invention of FIG. 6 exhibits hysteresis in its load turn-on and turn-off thresholds. Q3 produces a stable voltage drop to shift the turn-on threshold to a desired range. Additionally, the diode drops of Q2 and Q3 establish a low voltage cut off of approximately 1.8 volts in the particular embodiment specified. R3 provides hysteresis for the low voltage cut off scheme.

The low voltage sensing will not allow the load to re-energize until the battery voltage has risen substantially. However, the battery voltage cannot rise substantially until the battery has partially re-charged, a condition that implies the presence of significant illumination. Yet in the presence of significant illumination, the load will remain de-energized. This represents the beginning of another charge/discharge/idle cycle.

R1 provides a consistent load to the panel (10) to cause turn-on of the load (4) within the desired illumination range, regardless of panel leakage current. R1 also provides adequate drive current to Q3 to guarantee turn-on with panels having high dark resistance.

Those skilled in the art will understand that, in one sense, the embodiment of FIG. 2 also exhibits low voltage cutoff. However, in the FIG. 2 embodiment the voltage at which cutoff occurs is governed by only a single diode drop. At this point, the battery will be substantially depleted (but not totally depleted unless the optional resistors R1 and R2 are used). Because a typical lamp suitable for this circuit will cease to give off useful light below a drop of about 1.8 volts, the battery of this embodiment will continue to discharge through a substantially dark lamp until the governing transistor eventually cuts off.

In contrast, the embodiment of FIG. 6 exhibits a more practical low voltage cutoff. The point at which the lamp will de-energize is governed by three diode drops. Consequently, the load will be de-energized much sooner after the lamp has ceased to give off useful light, and at a substantially higher voltage of the battery. Less time and light energy will be required to recharge the battery.

The embodiments disclosed above are shown using transistors in the form of bi-polar transistors. If desired, other forms of switches, whether semiconductor or not, may be used. For example, with minor modifications to a circuit, any or all of the bi-polar transistors may be replaced with field-effect transistors (FET). Although most FET's operate well only at voltages higher than those generally available in circuits of the species actually described in detail, one of ordinary skill in the art could easily design a similar circuit using FET's and having a solar panel that produces a higher output voltage, a battery pack operating at a greater potential, and a load requiring a higher voltage. Such a circuit is within the ambit of the current invention.

Of course, it should be understood that a wide range of changes and modifications can be made to the preferred embodiments described above. It is therefore intended that the foregoing detailed description be regarded as illustrative rather than limiting, and that it be understood that it is the following claims, including all equivalents, which are intended to define the scope of this invention.

We claim:

1. A circuit for controlling the recharging of a rechargeable power source with a photovoltaic panel and for controlling the discharge of the rechargeable power source into a load, comprising:
   a rechargeable power source;
   a photovoltaic panel operably connected to the rechargeable power source for supplying a charging current to the rechargeable power source whenever the voltage across the photovoltaic panel is greater than the voltage across the rechargeable power source by a predetermined amount;
   means for substantially blocking current flow from the rechargeable power source to the photovoltaic panel;
   a load; and
   switching means responsive too the voltage across the photovoltaic panel:
   for connecting the load across the rechargeable power source when the voltage across the photovoltaic panel drops below a load turn-on threshold, and
   for disconnecting the load from the rechargeable power source when the voltage across the photovoltaic panel is above a load turn-off threshold, wherein said load turn-off threshold is unequal to said load turn-on threshold.

2. The apparatus of claim 1, wherein the switching means is responsive to the voltage of the rechargeable power source and establishes a low voltage threshold at a voltage level across the rechargeable power source that is substantially higher than the voltage level of full discharge of the rechargeable power source, thereby hastening recharging of the rechargeable power source.

3. The apparatus of claim 1, wherein the switching means comprises means for providing hysteresis at the thresholds to restrain frequent cycling of current to the load.

4. The apparatus of claim 1, wherein the switching means comprises feedback means to hasten turn-on of the load at the load turn-on threshold.

5. The apparatus of claim 1, wherein the load is an electric lamp.

6. The apparatus of claim 1, wherein the switching means comprises
   a first switch responsive to the voltage across the solar panel such that the first switch is off when the voltage across the panel is below the turn-on threshold;
   a second switch responsive to the first switch such that the second switch turns on when the first switch turns off;
   a third switch responsive to the second switch such that the third switch is on when the second switch is on and the third switch is off when the second switch is off, the third switch being connected such that the load is energized when the first switch is on.

7. The apparatus of claim 6, wherein the first, second and third switches are transistors.

8. The apparatus of claim 7, wherein the transistors are bi-polar transistors.

9. The apparatus of claim 6, further comprising temperature compensation means for minimizing variations in at least one of the turn-on and turn-off thresholds resulting from variations in the temperature of the first switch.

10. The apparatus of claim 9, further comprising a fourth switch operatively connected to the rechargeable power source and to the photovoltaic panel such that the fourth switch is responsive to the difference in voltage between a terminal of the rechargeable power source and a terminal of the photovoltaic panel, the first switch being responsive to the fourth switch so as to change state when the voltage of the photovoltaic panel is below the turn-on threshold.

11. The apparatus of claim 10, wherein the first and fourth switches are substantially identical, further comprising means for maintaining a fixed ratio of the actuation voltage to which the fourth switch is responsive and the actuation voltage to which the first switch is responsive.

12. A circuit for controlling the recharging of a rechargeable power source with a photovoltaic panel and for controlling the discharge of the rechargeable power source into the load, comprising:
    a rechargeable power source;
    a photovoltaic panel;
    a load; and
    switching means responsive to the voltage across the photovoltaic panel;
    for connecting the load across the rechargeable power source when the voltage across the photovoltaic panel drops below a load turn-on threshold, and
    for disconnecting the load from the rechargeable power source when the voltage across the photovoltaic panel is above a load turn-off threshold,
    the switching means consisting essentially of three transistors and a plurality of resistors connected so as to form a dual-threshold voltage sensing circuit.

13. The apparatus of claim 12, wherein said load turn-on and load turn-off thresholds are unequal.

14. The apparatus of claim 12, wherein the switching means comprises feedback means to hasten turn-on of the load at the load turn-on threshold.

15. The apparatus of claim 12, wherein the load is an electric lamp.

16. The apparatus of claim 12, wherein the transistors are bi-polar transistors.

17. A circuit for controlling the recharging of a rechargeable power source with a photovoltaic panel and for controlling the discharge of the rechargeable power source into the load, comprising:
    a rechargeable power source;
    a photovoltaic panel;
    a load; and
    switching means responsive to the voltage across the photovoltaic panel;
    for connecting the load across the rechargeable power source when the voltage across the photovoltaic panel drop below a load turn-on threshold, and
    for disconnecting the load from the rechargeable power source when the voltage across the photovoltaic panel is above a load turn-off threshold,
    the switching means consisting essentially of four transistors and a plurality of resistors connected so as to form a dual-threshold voltage sensing circuit.

18. The apparatus of claim 17, wherein said load turn-on and load turn-off thresholds are unequal.

19. The apparatus of claim 17, wherein the switching means comprises feedback means to hasten turn-on of the load at the load turn-on threshold.

20. The apparatus of claim 17, wherein the load is an electric lamp.

21. The apparatus of claim 17, wherein the transistors are bi-polar transistors.

22. A solar powered accent light comprising:
    a housing having a top, a bottom, and generally triangular sides,
    a rechargeable power source located in said housing,
    a solar panel located on the top side of said housing, said solar panel connected and adapted to charge said rechargeable power source,
    a lens connected to said housing,
    a lamp positioned behind said lens, said lamp connected to and adapted to be powered by said rechargeable power source,
    means for preventing said rechargeable power source from discharging through said solar panel upon the condition that the voltage across said solar panel is less than the voltage across said rechargeable power source, and
    a switching means connected to said lamp, said solar panel and said rechargeable power source,
    said switching means responsive to the voltage across said solar panel and cooperable to disconnect said lamp from said rechargeable power source upon the condition that the voltage across said solar panel is at or above a threshold, and
    said switching means being further operable to connect said lamp to said solar rechargeable power source upon the condition that the voltage across said solar panel is below said threshold,
    whereby said lamp if powered by said rechargeable power source provides illumination which is visible through said lens.

23. The solar powered accent light of claim 22 further comprising:
    a solitary mounting stake connectable to said housing for mounting said accent light outdoors in the ground.

24. The solar powered accent light of claim 23 in which said lens includes at least one face oriented downward.

25. The solar powered accent light of claim 24 further in which said switching means comprises:
    a transistor.

26. The solar powered accent light of claim 25 in which the base terminal of said transistor is connected to said solar panel, and said lamp is connected in series with either the collector or emitter of said transistor so that upon the condition that the voltage across said solar panel is less than said threshold, said transistor conducts between the collector and emitter thereof whereby said rechargeable power source can provide current to said lamp.

27. A solar powered accent light comprising:
    a housing,
    a solitary mounting stake connectable to said housing for mounting said accent light outdoors in the ground,
    a lens connected to said housing,
    a lamp positioned behind said lens, a rechargeable power source located in said housing said rechargeable power source connected and adapted to provide power to said lamp, a solar panel located on an upper side of said housing, said solar panel source connected and adapted to charge said rechargeable power, means for preventing said rechargeable power source from discharging through said solar panel upon the condition that the voltage across said solar panel is less than the voltage across said rechargeable power source, and a switching means connected to said lamp, said solar panel and said rechargeable power source, said switching means responsive to the voltage across said solar panel and operable to disconnect said lamp from said rechargeable power source upon the condition that the voltage across said solar panel is at or above a threshold, and said switching means being further operable to connect said lamp to said rechargeable power source upon the condition that the voltage across said solar panel is below said threshold, whereby said lamp if powered by said rechargeable power source provides illumination which is visible through said lens.

28. The solar powered accent light of claim 27 in which said lens includes at least one face oriented downward.

29. A solar powered accent light comprising:
a housing,
a rechargeable power source located in said housing,
a solar panel located on a top side of said housing, said solar panel connected and adapted to charge said rechargeable power source, a lamp adapted to be powered by said rechargeable power source, a lens connected to said housing and covering said lamp said lens having at least one face oriented downward, means for preventing said rechargeable power source from discharging through said solar panel upon the condition that the voltage across said solar panel is less than the voltage across said rechargeable power source, and a switching means connected to said lamp, said solar panel and said rechargeable power source, said switching means responsive to the voltage across said solar panel and operable to disconnect said lamp from said rechargeable power source upon the condition that the voltage across said solar panel is at or above a threshold, and said switching means being further operable to connect said lamp to said rechargeable power source upon the condition that the voltage across said solar panel is bellow said threshold, whereby said lamp if powered by said rechargeable power source provides illumination which is visible through said lens.

30. The solar powered accent light of claim 29 in which said housing further comprises:
a top, a bottom, and generally triangular sides.

* * * * *